E. JOHNSON.
POTATO PLANTER.
APPLICATION FILED OCT. 25, 1912.
1,055,047.
Patented Mar. 4, 1913.
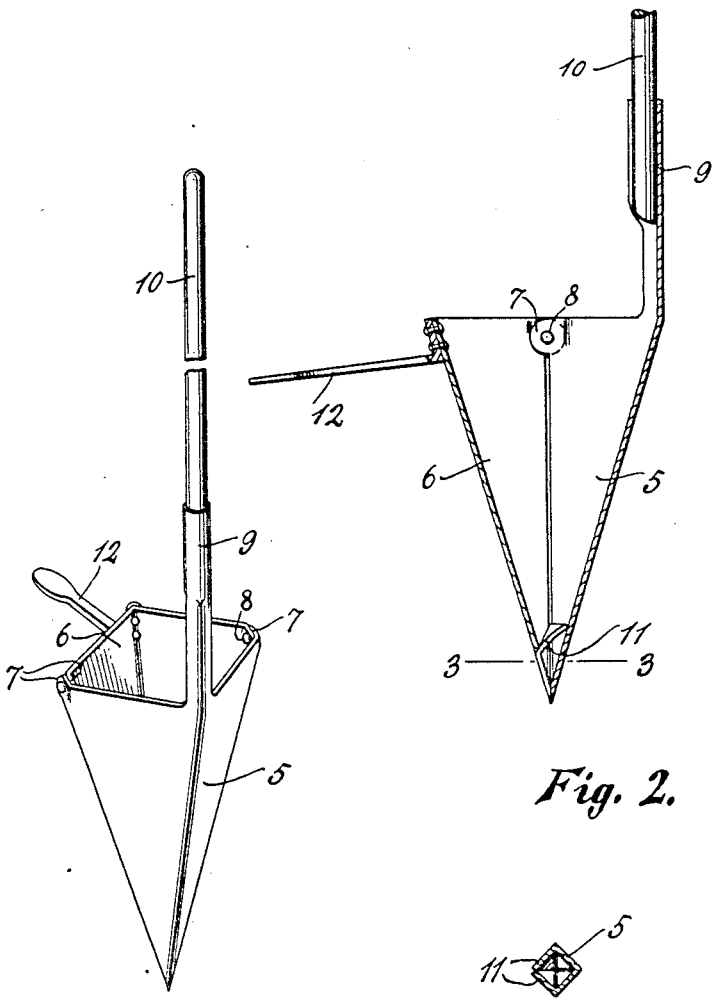
Fig. 1.
Fig. 2.
Fig. 3.
Witnesses
Einar Larson
Inventor
Erik Johnson.
By
Attorney

UNITED STATES PATENT OFFICE.

ERIK JOHNSON, OF GRASSTON, MINNESOTA.

POTATO-PLANTER.

1,055,047.  Specification of Letters Patent.  Patented Mar. 4, 1913.

Application filed October 25, 1912. Serial No. 727,768.

*To all whom it may concern:*

Be it known that I, ERIK JOHNSON, a citizen of the United States, residing at Grasston, in the county of Kanabec and State of Minnesota, have invented certain new and useful Improvements in Potato-Planters, of which the following is a specification.

This invention relates to that class of potato planters which are operated by hand, and its object is to provide a planter of this kind which can be easily operated, that portion of the planter which enters the ground being provided with a sharp driving point.

The invention also has for its object to so construct the driving point that it is strong, rigid and durable, and able to withstand hard work.

The herein stated objects are attained by a novel combination and arrangement of parts to be hereinafter described and claimed, reference being had to the accompanying drawing, in which—

Figure 1 is a perspective view of the implement. Fig. 2 is a central vertical section thereof. Fig. 3 is a cross-section on the line 3—3 of Fig. 2.

As shown in the drawing, the implement comprises two planting blades 5 and 6, respectively, which are pivotally connected so that they may be opened or closed as will be presently described. These blades are so shaped that when they are closed up they form a hopper which is tapered to a point so that it may be readily driven into the ground. The hopper is given the shape of a four sided pyramid by forming each blade out of a substantially triangular sheet and bending the same in line with the apex thereof to give the sheet an angular cross-sectional form. At the top of the hopper, the two blades have lapping ears 7 through which the pivots 8, whereby the pivotal connection between the blades is made, pass.

It will be noted that one of the blades is shorter than the other and terminates a short distance from the point thereof. This short blade is indicated by the reference numeral 6, the other blade being indicated by the numeral 5. The blade 5 has a shank 9 for attachment of a handle 10.

In order to reinforce the point of the blade 5, the blank out of which said blade is formed has two tongues 11 at the side edges thereof adjacent to the apex. These two tongues are bent inward toward each other, whereby the driving point of the blade is stiffened and reinforced so that it may be driven into heavy ground without danger of bending. The free end of the blade 6 is shaped to fit snugly against the adjacent side of the reinforced extremity of the blade 5, a short distance from the point thereof, and the tongues forming the reinforced portion are bent so as to coincide with the two sides of the blade 6.

By the herein described structure the continuity of the outer surface of the hopper is practically uninterrupted and is left smooth up to the point, in view of which there are no obstructions on the outside of the hopper to oppose its insertion into the ground. The hopper is also strong and durable, and its driving point can penetrate heavy ground without danger of being bent out of shape.

From the blade 6 near the top thereof extends an arm 12 which is for the purpose of opening the hopper. The hopper is adapted to be driven into the ground until the arm strikes the surface of the latter, whereupon the hopper swings open and the seed is discharged.

I claim:

A hand-planter comprising pivotally connected blades having a cross-sectional shape to form when closed a hopper, one of said blades being tapered to a point and the other blade terminating short of said point, the first mentioned blade having at its point side tongues extending inward toward each other to reinforce the point, the free end of the other blade being shaped to fit against the adjacent sides of the reinforced point, and the tongues being arranged to coincide with the sides of said last-mentioned blade.

In testimony whereof I affix my signature in presence of two witnesses.

ERIK JOHNSON.

Witnesses:
FRED C. FALK,
ARVID OLSON.